United States Patent [19]

Shenk

[11] 4,227,790
[45] Oct. 14, 1980

[54] AUTO/MANUAL FOCUS CONTROL MODE SELECTOR

[75] Inventor: Edwin K. Shenk, Westford, Mass.

[73] Assignee: Polaroid Corporation, Cambridge, Mass.

[21] Appl. No.: 19,257

[22] Filed: Mar. 9, 1979

Related U.S. Application Data

[63] Continuation of Ser. No. 899,863, Apr. 25, 1978, abandoned.

[51] Int. Cl.³ .................................................. G03B 3/00
[52] U.S. Cl. .......................................... 354/195; 354/25
[58] Field of Search ................... 354/25, 195; 352/140

[56] References Cited

U.S. PATENT DOCUMENTS

| 3,522,764 | 8/1970 | Biber | 354/195 |
| 3,563,151 | 2/1971 | Koeber | 354/195 |
| 3,713,371 | 1/1973 | Kurihara | 354/195 |
| 4,103,309 | 7/1978 | Massa | 354/195 |

Primary Examiner—John Gonzales
Assistant Examiner—S. D. Schreyer
Attorney, Agent, or Firm—John J. Kelleher

[57] ABSTRACT

Manual/automatic focus control mode selecting means are provided for an adjustable focus lens camera having both manual and automatic focus controls wherein said mode selecting means causes said automatic focus control to position said lens to a known reference point when the automatic focus control mode is selected and, in addition, reduces the power requirements of said automatic focus control.

9 Claims, 2 Drawing Figures

AUTO/MANUAL FOCUS CONTROL MODE SELECTOR

This is a continuation of application Ser. No. 899,863, filed Apr. 25, 1978, now abandoned.

BACKGROUND OF THE INVENTION

1. Field of the Invention

The present invention relates to a control system for an adjustable focus lens in general, and to such a control system for an adjustable focus lens in a photographic camera, in particular.

2. Description of the Prior Art

Adjustable focus lenses and apparatus utilizing such lenses, such as photographic cameras, telescopes and the like are well known and their operation well understood in the prior art. A camera having an adjustable focus lens and having a focus control system coupled to said lens for automatically focusing image carrying light rays of a remote object at the film plane of said camera in response to a rangefinder derived signal representative of the actual distance between said camera and said remote object, are also known in the prior art. A camera having such a focus control system that utilizes acoustical energy to determine the distance to an object remote from said camera is described in U.S. Pat. No. 3,522,764 to BIBER, et al.

A bidirectional focus control system, i.e., a focus control system that, once commanded to do so, can move the movable element of an adjustable focus lens in either of two directions from any initial position within the normal focusing range of said lens, for focusing purposes, is also known in the prior art. One example of such a system is described in the above-mentioned BIBER et al. patent.

Another type of focus control system for an adjustable focus lens is sometimes referred to as a unidirectional focus control system in that the movable or focusing element of such a lens is always moved from the same or known reference point for focusing purposes. While such an element is movable in either of two axial directions, no lens focusing is performed as said element moves within its focusing range towards said reference point. A unidirectional focus control system of this type is significantly less complex than a bidirectional focus control system because it is unnecessary to continuously monitor lens element movement as said element is moved toward said known reference point. The cost savings attendant a unidirectional focus control system over a bidirectional focus control system makes the unidirectional focus control system attractive to the control system designer.

In my copending U.S. patent application Ser. No. 865,852, I disclosed a manual and a unidirectional automatic focus control system for a self-processing adjustable focus lens camera. For convenience, the specification in said application is specifically incorporated herein. In said unidirectional focus control system, the focus control mode is selected by switch means actuated by adjustable focus lens movement outside of the normal focusing range of said adjustable focus lens. The manual focus control mode is selected by manually moving said lens to any position within its normal focusing range. The automatic focus control mode of said control system is selected by actuating said switch means by either manually moving said adjustable focus lens to a predetermined position outside of its normal focusing range or, in another embodiment thereof, by taking a picture when said lens is within its normal focusing range which will cause the automatic focus control system to position said lens to said predetermined position after a picture has been taken and fully processed. Focus control mode selecting means that does not rely on lens position are not provided. Because lens movement and mode selection are so interrelated, and because separate focus control mode selecting means are not provided, a camera operator may fail to take note of lens position and incorrectly assume that the camera is in its automatic focus control mode at the beginning of a picture taking sequence which may result in the taking of at least one out-of-focus picture. Another potential problem is the possibility of a camera operator draining the camera's battery by leaving said camera in its manual focus control mode for an extended period of time. The nature of the control system in my above-cited patent application is such that leakage currents are drawn by the automatic focus control system when the manual focus mode is selected, and though relatively small, these leakage currents could be enough to render the camera's battery inoperative if the camera was left in its manual focus control mode and then stored for an extended period of time.

SUMMARY OF THE INVENTION

In accordance with the teachings of the present invention, a photographic camera having an adjustable focus lens and having a manual and an automatic focus control system requiring focusing movement of said adjustable focus lens from a reference position outside of its normal focusing range for proper operation of said automatic focus control, is provided with manual/automatic focus control mode selecting means that reduces control system power requirements and, in addition, causes the automatic focus control system to position said adjustable focus lens to said reference position when the automatic focus control mode is selected.

DESCRIPTION OF THE PREFERRED EMBODIMENT

Figure 1:
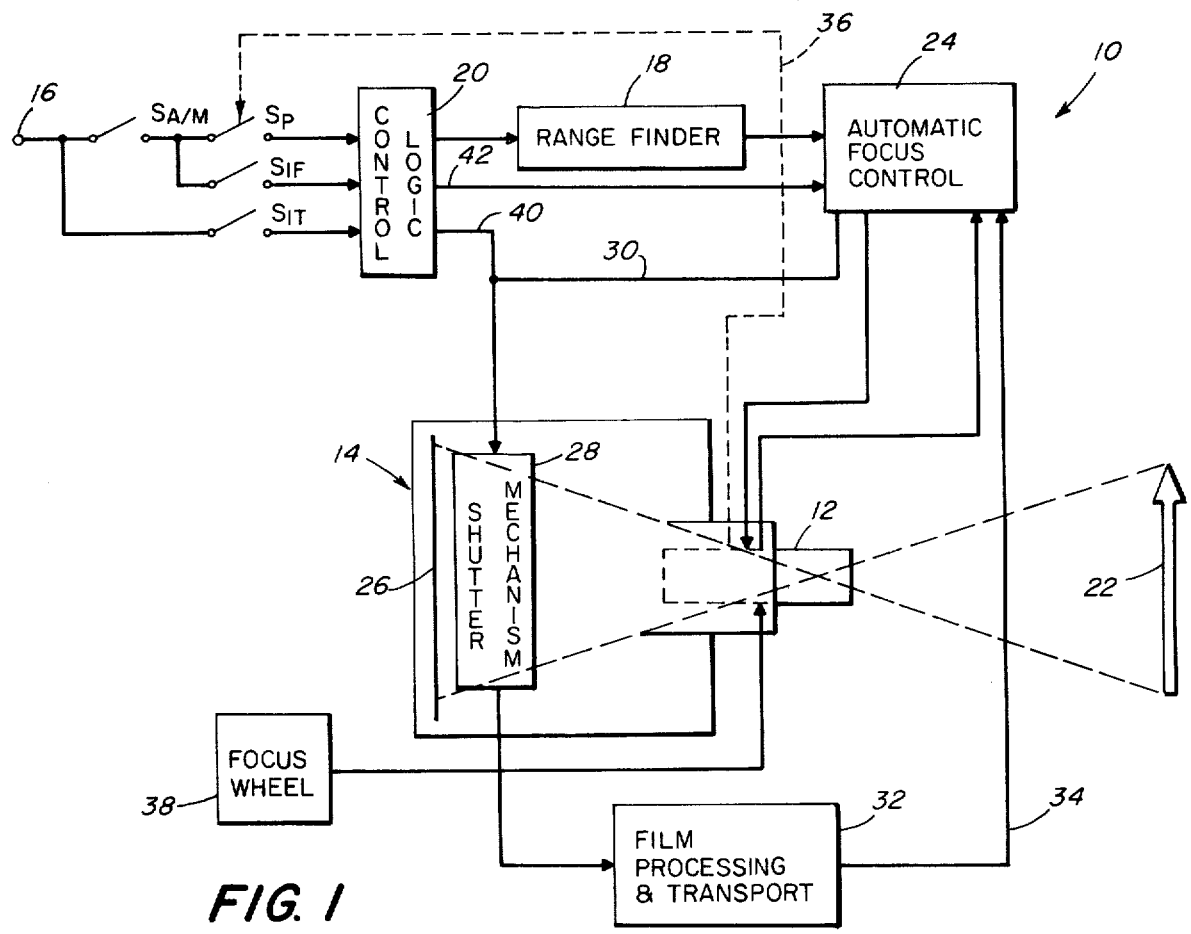
FIG. 1 is a schematic diagram of an automatic and manual focus control system for an adjustable focus lens that is constructed in accordance with a preferred embodiment of the present invention.

Referring now to the drawings and specifically to FIG. 1, a schematic diagram of manual and automatic focus control system 10 for adjustable focus lens 12, of self-processing camera 14, is depicted. The automatic focus control portion of said control system 10 is described in some detail in the above-cited SHENK application. In order to automatically focus adjustable focus lens 12, both mode select switch $S_{A/M}$ and switch $S_{1F}$, must be actuated to their closed positions. If switches $S_{A/M}$ and $S_{1F}$ are actuated to their closed positions, a portion of the source of power from an internal camera 14 battery (not shown) which is connected to terminal 16 will, in turn, be routed to the input of rangefinder 18 through control logic 20 thereby activating said rangefinder 18. When so activated, rangefinder 18 acoustically determines the distance to a subject to be photographed such as subject 22. A more detailed explanation of how rangefinder 18 determines distance to a remote subject is contained in said above-cited SHENK application. When the distance to subject 22 has been determined, rangefinder 18 causes automatic focus control 24 to transmit a lens element positioning force to the movable element of adjustable focus lens 12 causing said lens 12 to form an in-focus image of subject 22 at film plane 26 of said camera 14 when shutter mechanism 28 has been actuated to its open position by a signal from automatic focus control 24 through path 30. As mentioned above, camera 14 is of the self-processing type and therefore, once the actuation of shutter mechanism 28 is complete, film processing and transport cycle 32 is initiated. This cycle initiates film processing and film movement out of said camera 14. If switch $S_{1F}$ is in its open position when film processing and transport cycle complete signal 34 is transmitted to automatic focus control 24, said automatic focus control 24 will cause the movable element of adjustable focus lens 12 to be driven to the point where lens movement actuated switch $S_p$ is actuated to its open position by adjustable focus lens 12 movement through mechanical linkage 36. Switch $S_p$ is also referred to herein as the park switch.

In order to take a manually focused picture of a remote object with self-processing camera 14, mode select switch $S_{A/M}$ must be actuated to its open position. With mode select switch $S_{A/M}$ actuated to its open position, switches $S_{1F}$ and $S_p$ are disabled. With switch $S_{A/M}$ so positioned, adjustable focus lens 12 is focused by the manual movement of focus wheel 38. Once adjustable focus lens 12 has been focused to the correct subject-in-focus position, shutter mechanism 28 is actuated, for picture taking purposes, by manually actuated switch $S_{1T}$ to its closed position which will cause a shutter actuating signal to be sent to shutter mechanism 28 through path 40. When shutter mechanism 28 has been fully actuated, film processing and transport cycle 32 is then automatically initiated, said cycle functioning in the same manner as when initiated in the automatic focus control mode. If lens movement actuated switch $S_p$ was actuated to and left in its closed position by the manual movement of adjustable focus lens 12 by focus wheel 38, automatic focus control 24 will sense said switch $S_p$ closure through path 42 when mode select switch $S_{A/M}$ is subsequently actuated to its closed position and cause said adjustable focus lens 12 to be driven until switch $S_p$, which is mechanically linked to adjustable focus lens 12 through linkage 36, is actuated to its open position by adjustable focus lens 12 movement. Lens movement actuated switch $S_p$ is actuated to its open position when said adjustable focus lens 12 moves a predetermined minimum distance outside of its normal focusing range. This predetermined distance corresponds to the reference position from which all automatic focusing is initiated by unidirectional automatic focus control 10. A logic diagram of automatic and manual focus control system 10 for adjustable focus lens 12 is depicted in FIG. 2.

Figure 2:
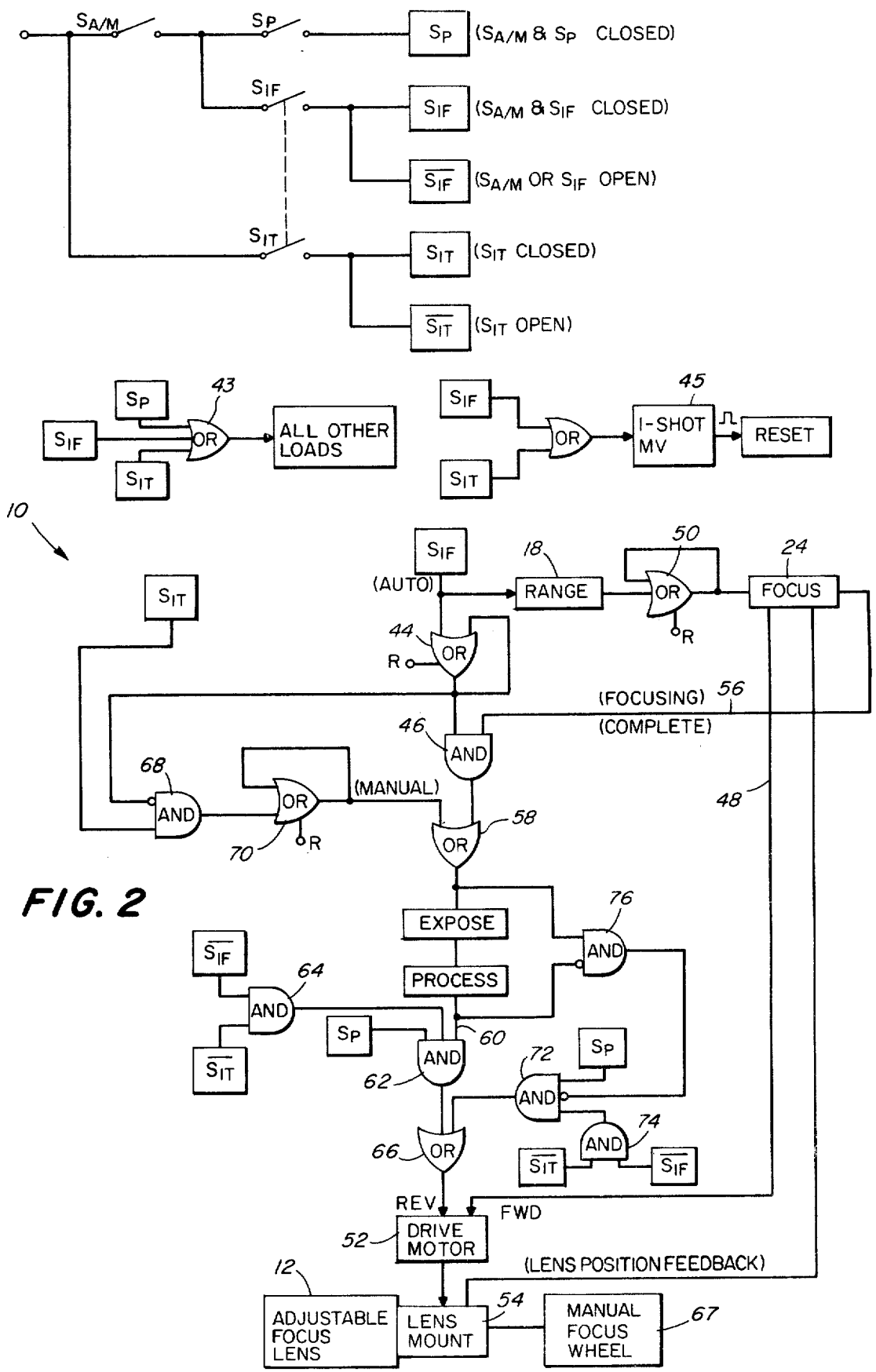
FIG. 2 is a logic diagram of the operation of the manual and automatic focus control system depicted in FIG. 1.

In FIG. 2, focus control system 10 including focus control mode select switch $S_{A/M}$ and utilizing adjustable focus lens 12 movement outside of its normal focusing range in accordance with a preferred embodiment of the present invention, is depicted. In control system 10, a source of electrical power from an internal battery (not shown) of camera 14 (FIG. 1) is supplied to one terminal of mode select switch $S_{A/M}$ and to one terminal of manually actuated, spring force biased, single pole switch $S_{1T}$. In addition, when mode select switch $S_{A/M}$ has been actuated to its closed position, power will be supplied to one terminal of lens movement actuated single pole switch $S_p$ and to one terminal of manually actuated, spring force biased, single pole switch $S_{1F}$. Switches $S_{1F}$ and $S_{1T}$ are mechanically interlocked such that switch $S_{1F}$ closes before switch $S_{1T}$. Signal $S_p$ will appear at the output of switch $S_p$ when switches $S_{A/M}$ and $S_p$ are both closed. Signal $S_{1F}$ will appear at the output of switch $S_{1F}$ when both switches $S_{A/M}$ and $S_{1F}$ are closed. Signal $\overline{S}_{1F}$ will appear at the output of switch $S_{1F}$ when either switches $S_{A/M}$ or $S_{1F}$ are open. Signal $S_{1T}$ will appear at the output of switch $S_T$ when switch $S_{1T}$ is closed and signal $\overline{S}_{1T}$ will appear at the output of switch $S_{1T}$ when switch $S_{1T}$ is open. When signals $S_p$, $S_{1F}$, or $S_T$ are generated, power will be supplied to loads other than those depicted in FIG. 2 through OR gate 43. The loads depicted in FIG. 2 will receive their power in accordance with the control system of FIG. 2.

In order to have control system 10 automatically focus adjustable focus lens 12 on a subject to be photographed, automatic/manual mode select switch $S_{A/M}$ must be actuated to its closed position. If lens movement actuated switch $S_p$ is closed at the time that switch $S_{A/M}$ is closed, control system 10 will cause adjustable focus lens 12 to be driven until said switch $S_p$ opens. The operation of switch $S_p$ under these conditions will be discussed in greater detail elsewhere herein. With mode select switch $S_{A/M}$ closed, an automatically focused picture will be taken by camera 14 (FIG. 1) by actuating switch $S_{1F}$ to its closed position. When switches $S_{A/M}$ and $S_{1F}$ are both closed, signal $S_{1F}$ will appear at the output of said switch $S_{1F}$ and at the input of rangefinder 18. When signal $S_{1F}$ appears at the input to rangefinder 18, said rangefinder 18 is activated such that it determines the distance to a subject to be photographed, said rangefinder 18 functioning as it does in FIG. 1. Signal $S_{1F}$ also appears at the input to latching OR gate 44 which renders said OR gate 44 conductive. Latching OR gate 44 will remain conductive until reset, once there is an output from said gate 44. A latching OR gate will remain conductive once it has an output because said output is fed back into the input of said OR gate which causes said gate to be maintained in its conductive state. The output from gate 44 is removed only when said gate is reset by a pulse that is generated by one-shot multivibrator 45, said multivibrator generating said pulse when switch $S_{1F}$ is initially actuated to its closed position while switch $S_{A/M}$ is closed. The output of latching OR gate 44 is fed to AND gate 46, said AND gate 46 being held nonconductive until focusing means 24 has positioned adjustable focus lens 12 to the correct subject-in-focus position.

After the distance to a subject to be photographed has been determined by rangefinder 18, a range complete signal is sent to latching OR gate 50 and the output of latching OR gate 50 is transmitted to focus control means 24 to initiate adjustable focus lens 12 focusing. Latching OR gate 50 maintains a focus initiate signal to focusing means 24 if switch $S_{1F}$ is opened before focusing is complete. Focus control means 24 functions in the same manner as it does in FIG. 1. Focus control means 24 sends drive forward signal 48 to drive motor 52 commanding said drive motor 52 to drive lens mount 54 together with the movable element of adjustable focus lens 12 to the correct subject-in-focus position, said in-focus position to be sensed by lens position sensing means that are described in some detail in the above-cited SHENK application. Once focusing is complete, focusing complete signal 56 renders AND gate 46 conductive and the output from said AND gate 46 renders OR gate 58 conductive. The output from OR gate 58 actuates a shutter mechanism which exposes and subsequently initiates the processing of an instant developing film such as that sold by the Polaroid Corporation under the registered trademark SX-70. In a camera where instant developing film is not utilized, the output from OR gate 58 would merely trigger a conventional, electrically actuated shutter mechanism. Once processing is complete, or in the case of a nonself-processing film camera, once the shutter mechanism has been fully actuated, shutter actuation or film processing complete signal 60 is sent to AND gate 62. If spring biased open switch $S_{1F}$ has been released by a camera operator, signal $\overline{S}_{1F}$ will be generated at its output and be present at the input to AND gate 64. Signal $\overline{S}_{1T}$ is already present at the input to AND gate 64 because switch $S_{1T}$ was never closed and therefore, said AND gate 64 will have an output that will be present at the input to AND gate 62. Signal $S_p$ is already present at the input to AND gate 62 because switch $S_p$ was actuated to its closed position when adjustable focus lens 12 moved toward its normal focusing range. The above-cited SHENK application explains the switch $S_p$ actuation sequence in much greater detail. When AND gate 62 is rendered conductive by the presence of processing complete signal 60, an output signal from AND gate 64, and signal $S_p$ at its input, AND gate 64 will send a reverse drive signal to drive motor 52 through OR gate 66 causing said drive motor 52 to drive lens mount 54 until lens actuated switch $S_p$ has been actuated to its open position by such lens mount 54 movement. When switch $S_p$ is actuated to its open position, signal $S_p$ will disappear from its output and gate 62 will be rendered nonconductive, thereby shutting off the reverse drive signal to drive motor 52. At this point, adjustable focus lens 12 is positioned a predetermined minimum distance outside of its normal focusing range and lens actuated switch $S_p$ is in its open position, said lens position being the reference point from which all automatic focusing is initiated. Control system 10 is now ready to again focus the movable element of adjustable focus lens 12 to another subject-in-focus position as determined by rangefinder 18, if switch $S_{1F}$ is again actuated to its closed position.

To manually focus adjustable focus lens 12, focus control mode switch $S_{A/M}$ is actuated to its open position. The movable element of adjustable focus lens 12 is then manually positioned to the correct subject-in-focus position by focus wheel 67. With mode switch $S_{A/M}$ in its open position, switch $S_{1T}$ is actuated to its closed position to initiate a picture taking sequence. Even though the mechanically interlocked switch $S_{1F}$ will be actuated to its closed position before switch $S_{1F}$ is closed, the fact that mode select switch $S_{A/M}$ is in its open position will prevent signal $S_{1F}$ from being generated at the output of switch $S_{1F}$. With switch $S_{1T}$ in its closed position, signal $S_{1T}$ will appear at the input to AND gate 68. There would be no output from latching OR gate 44 and therefore, AND gate 68 would be rendered conductive upon the arrival of signal $S_{1T}$ as its input. An output from AND gate 68 renders latching OR gate 70 conductive, said OR gate 70 remaining in its conductive state until reset by signal $S_{1T}$. An output from latching OR gate 70 renders OR gate 58 conductive which, in turn, initiates a film exposure and processing cycle in the case of a self-processing camera or merely actuates an electrically actuated shutter mechanism in the case of a nonself-processing camera.

Upon completion of film exposure, or of film exposure and processing, whichever the case might be, adjustable focus lens 12 is not driven to the point where switch $S_p$ opens because of a lack of a reverse drive output signal from AND gate 62 to cause drive motor 52 to be driven to the point where said switch $S_p$ opens. AND gate 62 is nonconductive in this instance because mode select switch $S_{A/M}$ is open which prevents signal $S_p$ from being generated at the output of switch $S_p$. When spring force biased switch $S_{1T}$ is subsequently released and is therefore actuated to its open position and with mode select switch $S_{A/M}$ also being in its open position, camera 14 (FIG. 1) can then be stored for an extended period of time without draining the internal battery of said camera 14. If switch $S_p$ is left in its closed position and automatic/manual mode select switch $S_{A/M}$ is actuated to its closed position which is the position where the automatic focus control mode is selected, adjustable focus lens 12 will be driven to the point where lens movement actuated switch $S_p$ is actuated to its open position. Lens movement actuated switch $S_p$ is driven to the position where said switch $S_p$ is actuated to its open position when mode select switch $S_{A/M}$ is closed because AND gate 72 is rendered conductive under these circumstances. AND gate 72 is rendered conductive because signal $S_p$ appears at its input due to switch $S_p$ being closed, an output from AND gate 74 is present at its input because switches $S_{1F}$ and $S_{1T}$ are spring force biased to their open positions and, an exposure initiate signal is not present at the output of OR gate 58 and at the output of AND gate 76. Because lens actuated switch $S_p$ is actuated to its open position when mode select switch $S_{A/M}$ is placed in its automatic or closed position, the internal battery of camera 14 (FIG. 1) will not be drained by control system 10 even if said camera 14 is stored for an extended period of time while said mode select switch $S_{A/M}$ remains in its automatic or closed position.

DISCUSSION

Focus control mode select switch $S_{A/M}$ in control system 10 readily indicates the focus control mode of said control system 10. In addition to readily indicating the focus control mode of said control system 10, the inclusion of switch $S_{A/M}$ in said focus control system avoids the possibility of electrical components in said control system draining the internal battery of camera 14 when said camera is stored for an extended period of time. If lens movement actuated switch $S_p$ is in its closed position as the result of the movable element of adjustable focus lens 12 having been manually moved and left within the focusing range of said lens 12, there is no possibility of current being unnecessarily drained from said internal battery of camera 14. If switch $S_{A/M}$ is open when switch $S_p$ is closed, current is precluded from flowing through said switch $S_p$. If switch $S_{A/M}$ is closed when switch $S_p$ is closed, control system 10 will cause the movable element of lens 12 to be driven until lens 12 movement actuated switch $S_p$ is actuated to its open position which will also preclude unnecessary current flow through said switch $S_p$.

Switches $S_{1F}$ and $S_{1T}$ are mechanically interlocked and collectively form a two-stage switch. As an alternate arrangement, the outputs from switches $S_{1F}$ and $S_{1T}$ could have been electrically interlocked. Switch stage $S_{1F}$ is actuated to its closed position before switch stage $S_{1T}$ can be fully closed. If switch $S_{A/M}$ is closed when switch stage $S_{1F}$ is closed, a subsequent output from switch stage $S_{1T}$ will not result in camera 14 shutter mechanism actuation by such switch stage $S_{1T}$ closure. Once there is an output from switch stage $S_{1F}$, control system 10 inhibits the subsequent output from switch stage $S_{1T}$. However, an output from switch stage $S_{1T}$ and no output from switch stage $S_{1F}$ will result in the actuation of shutter mechanism 28 and in the processing and transport of exposed self-processing film. When shutter mechanism 28 has been actuated by switch stage $S_{1T}$, it is assumed that the camera operator has previously positioned the movable element of adjustable focus lens 12 to the correct subject-in-focus position. Failure to so focus adjustable focus lens 12 prior to the actuation of switch stage $S_{1T}$ will result in an out-of-focus picture.

It will be apparent to those skilled in the art from the foregoing description of my invention that various improvements and modifications can be made in it without departing from its true scope. The embodiments described herein are merely illustrative and should not be viewed as the only embodiments that might encompass my invention.

I claim:

1. A photographic camera comprising:
   means for defining an image plane;
   means for directing scene light along a given optical path to said image plane, said directing means including a lens assembly having a lens mounted for displacement over a focusing range wherein various positons thereof respectively serve to focus an image at said image plane of subjects positioned in various locations within a predetermined range of subject distances, and for further displacement from its said focusing range into a second range wherein it does not serve to focus images at said image plane of subjects positioned within said predetermined subject distance range;
   lens position sensing means actuatable between an initial state and a second state for sensing that said lens has moved a predetermined minimum distance from a reference position within the said second range of said displaceable lens;
   energizeable first means for determining the distance between said camera and the position of a particular subject within said focusing range for producing a signal indicative of said particular subject distance;
   manually actuatable second means actuatable between an initial state and a second state for selecting the focus control mode of said camera;
   manually actuatable third means actuatable between an initial state and a second state for coupling said first means to a source of electrical energy when said second means is in its said second state;
   drive means responsive to the second state of said lens position sensing means for driving said lens to said reference position within its said second range and for actuating said lens position sensing means to its said initial state, and responsive to said subject distance signal for positioning said lens to the correct subject-in-focus position, when said second means is in its said second state;
   means responsive to said drive means for producing a signal indicating that said lens has been focused on a subject to be photographed; and
   means responsive to said subject-in-focus signal for unblocking and blocking said optical path to produce an exposure interval.

2. The camera of claim 1, further comprising:
   manually actuatable fourth means actuatable between an initial state and a second state; and
   said means for unblocking and blocking said optical path is additionally responsive to said fourth means.

3. The camera of claim 2, wherein said third means is the first stage and said second means is the second stage of a single two-stage switch.

4. The camera of claim 3, wherein the stages of said two-stage switch are interlocked such that said first stage must be actuated to its closed state before said second stage is actuated to its closed state.

5. The camera of claim 3, wherein an output signal from the first stage precludes an output signal from said second stage of said two-stage switch.

6. A photographic camera having automatic and manual focusing modes of operation comprising:
   means for receiving a source of electrical energy;
   a manually actuatable mode selector switch actuatable between an automatic focusing mode selected position and a manual focusing mode selected position;
   means for defining an image plane;
   a lens mounted for displacement over a given operational range wherein it alternately serves to focus images of subjects positioned in various locations within a normal range of selectable subject distances at said subject plane, and also for displacement outside of its said given operational range into another range wherein it does not serve to focus images of subjects positioned within said normal selectable subject distance range at said image plane, said lens having a normal at-rest position within its said other range;
   a shutter disposed in operative relationship with respect to said lens and said image plane;
   a park switch adapted to be changed from a first state to a second state responsive to said lens being displaced from its said other range into its said operational range and to be changed from its said second state back into its said first state responsive to said lens being displaced from its said operational range into its said normal at-rest position within its said other range;
   a manually accessible actuator having a normal first position and manually actuatable into a second position;
   energizable means for deriving a signal representative of the actual distance between said camera and a particular subject to be photographed; and
   means,
   (a) automatically responsive to the manual displacement of said actuator from its said first position into its said second position, when said park switch is in its said first state indicating that said lens is at its said at-rest position within its said other range and said mode selector switch is in its said automatic mode selected position, for effecting the energization of said distance signal deriving means, for effecting the displacement of said lens as a function of said derived signal into its position within its said operational range wherein it is adapted to focus an image of the particular subject to be photographed at said focal plane, for effecting the operation of said shutter to define an exposure interval at said focal plane, and for then returning said lens to its said at-rest position within its said other range, and (b) automatically responsive to the manual displacement of said actuator from its said first position into its said second position, when said park switch is in its said second position indicating that said lens is in its said operational range and said mode switch is in its said manual mode selected position, for effecting the operation of said shutter to define an exposure interval at said focal plane without effecting the energization of said distance signal deriving means or effecting any displacement of said lens, said last-stated means subsequently being responsive to the manual displacement of said mode selector switch back into its said automatic mode selected position to effect the displacement of said lens into its said at-rest position within its said other range.

7. The camera of claim 6, wherein said manually accessible actuator is additionally actuatable into a third position and said shutter mechanism is, (a) responsive to the manual displacement of said actuator to its said third position and not responsive to the actuation of said actuator to its said second position when said park switch is in its said first state and said mode selector switch is in its said automatic focusing mode selected position, and (b) responsive to said manual displacement of said actuator to its said third position, not responsive to the actuation of said actuator to its said second position, and independent of the state of said park switch when said mode selector switch is in its said manual focusing mode selected position.

8. A photographic camera having automatic and manual focusing modes of operation comprising:

means for defining an image plane;

means for directing scene light along a given optical path to said image plane, said directing means including a lens assembly having a lens mounted for displacement over a focusing range wherein various positions thereof respectively serve to focus an image at said image plane of subjects positioned in various locations within a predetermined range of subject distances, and for further displacement from its said focusing range into an adjacent lens displacement range wherein it does not serve to focus images at said image plane of subjects positioned within said predetermined subject distance, said adjacent range including a reference position from which focusing displacement of said displaceable lens is initiated when said camera is in its said automatic focusing mode of operation;

a lens movement actuated switch having an open state and a closed state, said switch being actuated to its said open state by the movement of said displaceable lens to its said reference position and said switch being actuated to its said closed state by the movement of said lens from its said reference position to a focus position within its said focusing range;

energizable distance sensing means for determining the distance between said camera and the position of a particular subject within said focusing range and for producing a signal indicative of said particular subject distance;

a manually actuatable focus mode selector switch actuatable between a manual position and an automatic position for selecting the manual or the automatic focusing modes of camera operation;

a manually actuatable sequence initiation switch actuatable between an open position and a closed position for coupling said distance sensing means to a source of electrical energy when said focus mode selector switch is in its said automatic position and ineffective for purposes of coupling said distance sensing means to the source of electrical energy when said focus mode selector switch is in its said manual position;

drive means for displacing said displaceable lens to said lens reference position within said adjacent lens displacement range, said lens displacement causing the actuation of said lens movement actuated switch to its said open state when said focus mode selector switch is positioned to its said automatic position if said lens movement actuated switch is in its said closed state and said drive means being rendered responsive to the actuation of said sequence initiation switch to its said closed state after said focus mode selector switch has been actuated to its said automatic position for displacing said displaceable lens to a lens focus position within its said focusing range in accordance with said energizable distance sensing means produced subject distance signal;

means responsive to said drive means for producing a signal indicating that said displaceable lens has been focused on a subject to be photographed; and a shutter responsive to said subject-in-focus signal for unblocking and blocking said given optical path to produce an exposure interval when said focus mode selector switch is in its said automatic position and responsive to the actuation of said sequence initiation switch to its said closed position and unresponsive to said subject-in-focus signal when said focus mode selector switch is in its said manual position.

9. A photographic camera having automatic and manual focusing modes of operation comprising:

means for defining an image plane;

means for directing scene light along a given optical path to said image plane, said directing means including a lens assembly having a lens mounted for displacement over a focusing range wherein various positions thereof respectively serve to focus an image at said image plane of subjects positioned in various locations within a predetermined range of subject distances, and for further displacement from its said focusing range into a second range wherein it does not serve to focus images at said image plane of subjects positioned within said predetermined subject distance range;

lens position sensing means actuatable between an initial state and a second state for sensing that said lens has moved a predetermined minimum distance from a reference position within the said second range of said displaceable lens;

energizable first means for determining the distance between said camera and the position of a particular subject within said focusing range and for producing a signal indicative of said particular subject distance;

manually actuatable second means actuatable between an initial state and a second state for selecting one or the other of said focusing modes of camera operation;

manually actuatable third means actuatable between an initial state and a second state for coupling said first means to a source of electrical energy when said second means is in its said second state and ineffective for purposes of coupling said first means to the source of electrical energy when second means is in its said first state;

drive means for displacing said displaceable lens to said lens reference position within its said second range, said lens displacement causing the actuation of said lens position sensing means to its said initial state when said second means is positioned to its said second state if said lens position sensing means is in its said second state and said drive means being rendered responsive to the actuation of said third means to its said second state after said second means has been actuated to its said second state for displacing said displaceable lens to a lens focus position within its said focusing range in accordance with said first means produced subject distance;

means responsive to said drive means for producing a signal indicating that said lens has been focused on a subject to be photographed; and means responsive to said subject-in-focus signal for unblocking and blocking said given optical path to produce an exposure interval when said second means is in its said second state and responsive to the actuation of said manually actuatable third means to its said second state and unresponsive to said subject-in-focus signal when said second means is in its said initial state.

* * * * *